United States Patent [19]

Nohe

[11] 3,862,217
[45] Jan. 21, 1975

[54] CYCLOHEXANE HEXACARBOXYLIC ACID
[75] Inventor: Heinz Nohe, Meckenheim, Germany
[73] Assignee: Badische Anilin- & Soda-Fabrik Aktiengesellschaft, Ludwigshafen/Rhine, Germany
[22] Filed: Mar. 12, 1973
[21] Appl. No.: 339,632

[30] Foreign Application Priority Data
Mar. 15, 1972 Germany................P 22 12 369.9

[52] U.S. Cl............. 260/514 K, 252/193, 260/346.3
[51] Int. Cl............................................ C07c 61/08
[58] Field of Search ...................... 260/514 R, 514 K

[56] References Cited
FOREIGN PATENTS OR APPLICATIONS
1,618,162   5/1971   Germany......................... 260/514 K OTHER PUBLICATIONS
Baeyer, "Uber die Mellithsaure," (1870), pp. 43–47, Annalen der Chemie und Pharmacia, Supplement 7.

Gilman, "Organic Chemistry; An Advance Treatise," (1943), page 482.

Baeyer, "Uberdie Mellithsaure," (1870), pp. 15–17, Annalen der Chemie und Pharmacia, Supplement 7.

Primary Examiner—Lorraine A. Weinberger
Assistant Examiner—Michael Shippen
Attorney, Agent, or Firm—Johnston, Keil, Thompson & Shurtleff

[57] ABSTRACT

A novel cyclohexane hexacarboxylic acid and its production by dehydration of a known cyclohexane hexacarboxylic acid with the formation of two novel dianhydrides and hydrolysis of the dianhydrides.

1 Claim, No Drawings

CYCLOHEXANE HEXACARBOXYLIC ACID

This invention relates to a new cyclohexane-1,2,3,4,5,6-hexacarboxylic acid, its preparation and its use as a complexing agent.

Three of the isomers of cyclohexane hexacarboxylic acid have hitherto been known, represented by the following formulae:

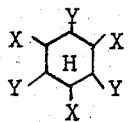 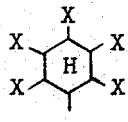 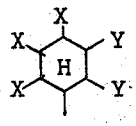

A          B          C

In these formulae X is a carboxyl group in equatorial position and Y is a carboxyl group in axial position. The all-cis cyclohexane hexacarboxylic acid A is formed in the oxidation of bicyclo [2,2,2] oct-7-ene-2,3,5,6-tetracarboxylic acid or its anhydride by the process disclosed in German Pat. No. 1,618,162. Acid B is formed from acid A by heating with hydrochloric acid, while acid C forms in the hydrolysis of the trianhydride of acid A.

We have found that the novel cyclohexane hexacarboxylic acid of the formula (I):

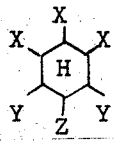

in which X is carboxy in equatorial position, Y is carboxy in axial position and Z is carboxy in axial or equatorial position, exhibits particularly good complex-forming properties and is far superior to the known isomers in its complex-forming capacity.

The new cyclohexane hexacarboxylic acid is prepared for example by dehydrating a cyclohexane hexacarboxylic acid at a temperature of from 80° to 300°C to form the dianhydride of the formula (II) or (III):

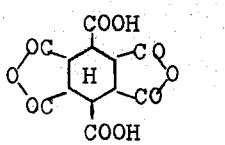 or 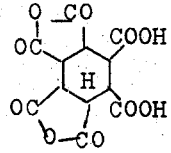

(II)              (III)

and hydrolyzing the dianhydride.

To dehydrate the cyclohexane hexacarboxylic acids the acids which have been obtained for example by the method of German Pat. No. 1,618,162 are heated until two moles of water have been eliminated. Temperatures of from 120°C to 270 C are preferred.

The acids may be heated for example as solids on sheet metal or while being moved in a rotary kiln or fluidized bed furnace. The acids may however also be suspended or dissolved in a liquid medium and the water entrained out. Suitable liquid media are organic solvents conventionally used for removing water such as toluene, xylene, mesitylene, decahydronaphthalene, tetrahydronaphthalene and α-methyl-naphthalene. The preferred amount of solvent is from once to five times the weight of the acid.

It is preferred to carry out the heating at subatmospheric pressure such as at from 5 to 760 mm. Inert gas may also be passed through the heating vessel during heating. The duration of the dehydration is usually from 15 minutes to 20 hours.

The new dianhydrides of formulae (II) and (III) or a mixture of the same is formed depending on the conditions in the dehydration. (II) is preferentially formed at above 200°C whereas (III) is preferentially formed below 200°C. (III) can be rearranged into (II) at temperatures of more than 210°up to 220°C.

The dianhydride may be heated in water to a temperature of from 80° to 100°C to cause hydrolysis. It is convenient to heat the dianhydride with an excess of water under reflux. The duration of the hydrolysis is usually from about 15 minutes to 5 hours. Hydrolysis may also be carried out in the presence of an alkali such as sodium hydroxide, potassium hydroxide, sodium carbonate, calcium hydroxide or the alkaline form of an acid ion exchanger. Thus the new acid is obtained for example in the form of the sodium salt when hydrolysis is carried out in the presence of sodium hydroxide. By adding the calculated amount of sodium hydroxide the monosodium, disodium, trisodium, tetrasodium, pentasodium, or hexasodium salt of cyclohexane hexacarboxylic acid can be prepared. If desired these salts may however be prepared from the acid in an analogous way. The salts may also be precipitated by adding organic solvents which are miscible with water, for example alcohols.

When dehydration of the acid is carried out in a suspension the hydrolysis may also be carried out without isolating the anhydride. For example the procedure may then be that after separation of the nonaqueous phase which can be used again the aqueous phase is evaporated to dryness to isolate the acid.

The new cyclohexane hexacarboxylic acid of formula (I) may be used for example as a crosslinking agent for polycondensations. Because of their good complex-forming ability the new acid and its alkali metal salts are especially suitable as complexing agents, for example for binding calcium or iron ions.

The following Examples illustrate the invention.

Example 1

362.5 g of all-cis cyclohexane hexacarboxylic acid of the formula A (with a water content of 4 percent) having a melting point of 222° to 224°C is dehydrated in a vacuum drying cabinet at 180°C and a pressure of 100 mm. After a dehydration period of five hours a quantitive yield of 312 g of dianhydride of the formula (III) is obtained having a melting point of 268° to 285°C with decomposition. When dehyrdation is carried out in a rotating flask in an oil bath at 190°C and 500 mm while passing a weak current of air through, the reaction is over after one hour.

At a dehydration temperature of 230°C the dianhydride of the formula (II) and a melting point of from 275°to 283°C with decomposition is obtained after about three hours. The structure of the dianhydrides is assigned by nuclear resonance spectroscopy. 312 g of anhydride is heated with 1,000 g of water for one hour at 100°C to hydrolyze it. After distilling off the water and drying, 375 g of cyclohexane hexacarboxylic acid of formula (I) is obtained having a melting point of 156° to 160°C and a water content of 8 percent. The total yield is 99 percent of theory. The structure of the compound is derived from the nuclear resonance spectrum. The carboxyl group Z is either in the axial or equatorial position. A definite assertion which of the two positions is present is not yet possible.

Example 2

362.5 g of 96 percent all-cis cyclohexane hexacarboxylic acid of the formula A is heated in a stirred flask fitted with a water separator with 1,000 g of tetrahydronaphthalene while stirring. The temperature rises within one hour from 180° to 215°C. 50.5 g of water condenses in the water separator. 1000 g of water is added to the suspension which is then heated to 100°C and cooled after half an hour. The two layers are separated and the aqueous layer is evaporated to dryness. 371 g of 92 percent cyclohexane hexacarboxylic acid of the formula (I) (+8 percent of water) is obtained having a melting point of 155° to 259°C. The yield is 98 percent of theory. The structure of the compound is derived from the nuclear resonance spectrum.

Example 3

362.5 g of all-cis acid of the formula A is dehydrated by the method of Example 1. Then the anhydride has added to it 200 g of sodium hydroxide (5 moles) dissolved in 600 g of water. The whole is heated for one hour at 100°C. After evaporation to dryness 455 g of the pentasodium salt of cyclohexane hexacarboxylic acid of formula (I) is obtained. The yield is 99.2 percent of theory. The sodium content is 25.0 percent.

The monosodium, disodium, trisodium, tetrasodium or hexasodium salt of cyclohexane hexacarboxylic acid may be obtained analogously depending on the molar amount of sodium hydroxide used.

I claim:
1. Cyclohexane-1,2,3,4,5,6-hexacarboxylic acid of the formula (I):

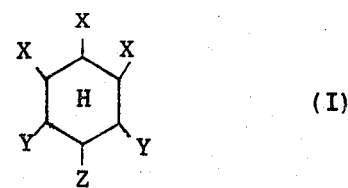

in which X is a carboxyl group in equatorial position,
Y is a carboxyl group in axial position and
Z is a carboxyl group in axial or equatorial position, said acid being obtained by dehydrating an all cis cyclohexane hexacarboxylic acid at a temperature of from 80° to 300°C to form the dianhydride of the formula

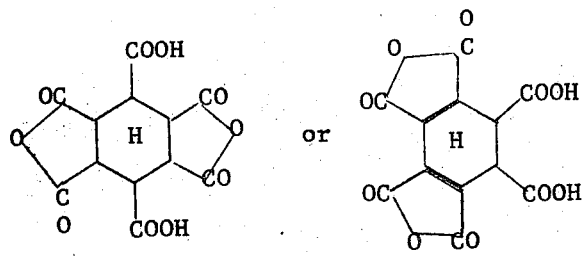

and hydrolyzing the dianhydride by heating it in water to a temperature of from 80° to 100°C.

* * * * *